United States Patent
Zoldi et al.

(10) Patent No.: US 11,144,834 B2
(45) Date of Patent: Oct. 12, 2021

(54) METHOD FOR REAL-TIME ENHANCEMENT OF A PREDICTIVE ALGORITHM BY A NOVEL MEASUREMENT OF CONCEPT DRIFT USING ALGORITHMICALLY-GENERATED FEATURES

(71) Applicant: FAIR ISAAC CORPORATION, San Jose, CA (US)

(72) Inventors: Scott Michael Zoldi, San Diego, CA (US); Jim Coggeshall, San Diego, CA (US); Yuting Jia, San Diego, CA (US)

(73) Assignee: FAIR ISAAC CORPORATION, Roseville, MN (US)

(*) Notice: Subject to any disclaimer, the term of this patent is extended or adjusted under 35 U.S.C. 154(b) by 1158 days.

(21) Appl. No.: 14/880,130

(22) Filed: Oct. 9, 2015

(65) Prior Publication Data
US 2017/0103340 A1    Apr. 13, 2017

(51) Int. Cl.
*G06N 5/02* (2006.01)
*G06N 7/00* (2006.01)
*G06F 17/18* (2006.01)
*G06N 20/00* (2019.01)
*G06N 3/08* (2006.01)

(52) U.S. Cl.
CPC .............. *G06N 5/02* (2013.01); *G06F 17/18* (2013.01); *G06N 3/084* (2013.01); *G06N 7/005* (2013.01); *G06N 20/00* (2019.01)

(58) Field of Classification Search
CPC ...... G06F 17/30; G06N 99/00; G05B 13/9265
See application file for complete search history.

(56) References Cited

U.S. PATENT DOCUMENTS

2004/0259062 A1* 12/2004 Heller ................... G09B 7/077
434/236
2007/0260568 A1* 11/2007 Perng .................... G06N 5/025
706/47

(Continued)

OTHER PUBLICATIONS

Bifet, A. et al. (2010), "Leveraging Bagging for Evolving Data Streams," *Proceedings of the 2010 European Conference on Machine Learning and Knowledge Discovery in Databases: Part I*, pp. 135-150.

(Continued)

*Primary Examiner* — Li B. Zhen
*Assistant Examiner* — Peter D Coughlan
(74) *Attorney, Agent, or Firm* — Mintz Levin Cohn Ferris Glovsky and Popeo, P.C.; F. Jason Far-hadian, Esq.

(57) ABSTRACT

A predictive analytics system and method in the setting of multi-class classification are disclosed, for identifying systematic changes in an evaluation dataset processed by a fraud-detection model by examining the time series histories of an ensemble of entities such as accounts. The ensemble of entities is examined and processed both individually and in aggregate, via a set of features determined previously using a distinct training dataset. The specific set of features in question may be calculated from the entity's time series history, and may or may not be used by the model to perform the classification. Certain properties of the detected changes are measured and used to improve the efficacy of the predictive model.

17 Claims, 13 Drawing Sheets

(56) References Cited

U.S. PATENT DOCUMENTS

| | | | | |
|---|---|---|---|---|
| 2008/0071721 A1* | 3/2008 | Wang | ............... | G06N 99/005 |
| | | | | 706/48 |
| 2008/0126556 A1* | 5/2008 | Perng | ............... | H04L 65/607 |
| | | | | 709/231 |
| 2009/0030862 A1* | 1/2009 | King | ............ | G06F 17/30705 |
| | | | | 706/45 |
| 2014/0058914 A1* | 2/2014 | Song | ............. | G06Q 40/06 |
| | | | | 705/35 |
| 2014/0079297 A1* | 3/2014 | Tadayon | ............ | G06K 9/00 |
| | | | | 382/118 |
| 2014/0096249 A1* | 4/2014 | Dupont | ............... | G06F 21/00 |
| | | | | 726/23 |
| 2014/0140213 A1* | 5/2014 | Raleigh | ............ | H04L 65/601 |
| | | | | 370/235 |
| 2015/0026027 A1* | 1/2015 | Priess | ............... | G06Q 40/00 |
| | | | | 705/35 |

OTHER PUBLICATIONS

Gama, J. et al. (2014), "A Survey on Concept Drift Adaptation," *ACM Computing Surveys*, vol. 46, No. 4, Article 44, 37 pages.
Harel, M. et al. (2014), "Concept Drift Detection Through Resampling," *Proceedings of the 31st International Conference on Machine Learning*, Beijing, China, JMLR: W&CP vol. 32, 9 pages.
Kadwe, Y. et al. (Jan.-Feb. 2015), "A Review on Concept Drift," *IOSR Journal of Computer Engineering*, vol. 17, Issue 1, Ver. II, pp. 20-26.

* cited by examiner

METHOD FOR REAL-TIME
ENHANCEMENT OF A PREDICTIVE
ALGORITHM BY A NOVEL MEASUREMENT
OF CONCEPT DRIFT USING
ALGORITHMICALLY-GENERATED
FEATURES

TECHNICAL FIELD

The subject matter described herein relates to predictive analytics in the setting of multi-class classification. More specifically, this disclosure relates to a system and method for identifying systematic changes in an evaluation dataset processed by a fraud-detection model.

BACKGROUND

Predictive models driven by machine learning algorithms have a storied history in the related fields of fraud and outlier detection. In particular, the problem of payment card fraud detection had become increasingly intractable until it was addressed using a neural network, with remarkable success. These techniques are effective for two principal reasons: First, the input variables used in classifying a given transaction summarize those cardholder behaviors that are both strongly indicative of fraud and sufficiently fundamental as to generalize well to patterns that are unseen in the training dataset, and second, the algorithm is sufficiently powerful as to detect fraud signals that manifest themselves only in interactions among many of the input variables, the primary task of the model being to construct a feature space in which these fraud signals are more easily distinguished from the background of legitimate transactions.

For the same reason, even a model whose input variables summarize the relevant cardholder behaviors perfectly will become less effective over time because the feature space representation may vary in time. For example, such a variation may be expected to occur as a result of the Europay, Mastercard and Visa (EMV) global payment system migration in the United States, causing the rates at which existing modes of fraud occur to vary from time to time and region to region, and to introduce entirely new modes of fraud. Whether the model will still perform in the presence of such variations as it would without is an issue of central importance from an operational point of view. To that end, what is needed is a method by which to detect and characterize these variations, and to fine-tune the model output based on these characterizations.

This problem, which is ubiquitous in the field of predictive analytics, is referred to generally as "concept drift" or "dataset drift," and is analogous to the well-known bias-variance tradeoff. Because concept drift necessarily involves explicit time dependence, its characterization may be informed by notions of causality and stationarity, which manifest themselves only implicitly in batch-mode regularization.

A great deal of work in the machine learning community has been devoted to addressing the question of how best to handle concept drift in various cases. In circumstances under which the class label for an input record in a given time series is typically not available until well after multiple subsequent input records in the same time series will have been processed by the model, any concept drift occurring on a shorter timescale must be detected without the use of class labels. Relevant techniques generally involve construction of a figure of merit intended to summarize the time series of the raw input data, such that all information relevant to the class label is reflected by the figure of merit.

Methods for robust outlier detection in the fully unsupervised case are well established. However, these methods frequently fail to perform optimally when applied naïvely to classification problems, especially in the presence of substantial class membership imbalance. The primary challenge in these cases is in feature construction and selection; specifically, it will typically be difficult to distinguish among classes (or between outliers and non-outliers) for the vast majority of possible features and feature spaces.

These problems become more acute as class imbalance increases and as the feature space on which classes are sufficiently distinguishable as to allow for the algorithm to perform well increases in size or functional complexity. In such cases, it is unlikely that any algorithm trained without class labels could reliably separate the according to their true class labels.

On the other hand, if the feature space on which the unsupervised model were intended to operate had been constructed via a supervised algorithm, no additional embedding would be necessary, provided that the functional relationship between the tag and the features does not vary. In practice, this relationship is typically extremely complex and is constantly changing, but it is quantifiable via empirical examination of the data within the feature space. Examining the data in the feature space magnifies any change that is relevant to the efficacy of the classifier and suppresses any other.

SUMMARY

This document presents a computer-implemented predictive analytics system and method in the setting of multi-class classification, for identifying systematic changes in an evaluation dataset processed by a fraud-detection model. The system and method examine the time series histories of an ensemble of entities (such as accounts, for example), both individually and in aggregate, via a set of features determined previously using a distinct training dataset. In general, the specific set of features in question may be calculated from the entity's time series history, and may or may not be used by the model to perform the classification. Certain properties of the detected changes are measured and used to improve the efficacy of the predictive model.

In one aspect, a method and system includes selecting at least one attribute of one or more input data records, and partitioning one or more datasets according to a partitioning scheme that is based on the at least one attribute, each of the one or more datasets having at least one input data record. The method and system further include generating a set of features based on historical data records, each of the historical data records having a known class membership, the set of features being generated according to different class labels for the known class membership. The method and system further include calculating a set of microscopic derived features for each new input data record and/or previous input data records, based on the partitioning and the set of features, the set of microscopic derived features being related to the selected at least one attribute, and generating a set of macroscopic derived features based on the aggregated set of microscopic derived features calculated for the new and previous input data records based on the partitioning and the set of features, the set of macroscopic derived features representing concept drift of the one or more datasets.

The system and method further include generating a first probability score representing a likelihood of an extent and magnitude of the concept drift. The system and method further include generating, using the set of microscopic derived features and the set of macroscopic derived features for previous input data records, a second probability score representing a likelihood that a new input data record is subject to the extent and magnitude of the concept drift representing by the first probability score, and adjusting a class membership for the new input data record based on the second probability score and according to the magnitude of the concept drift.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
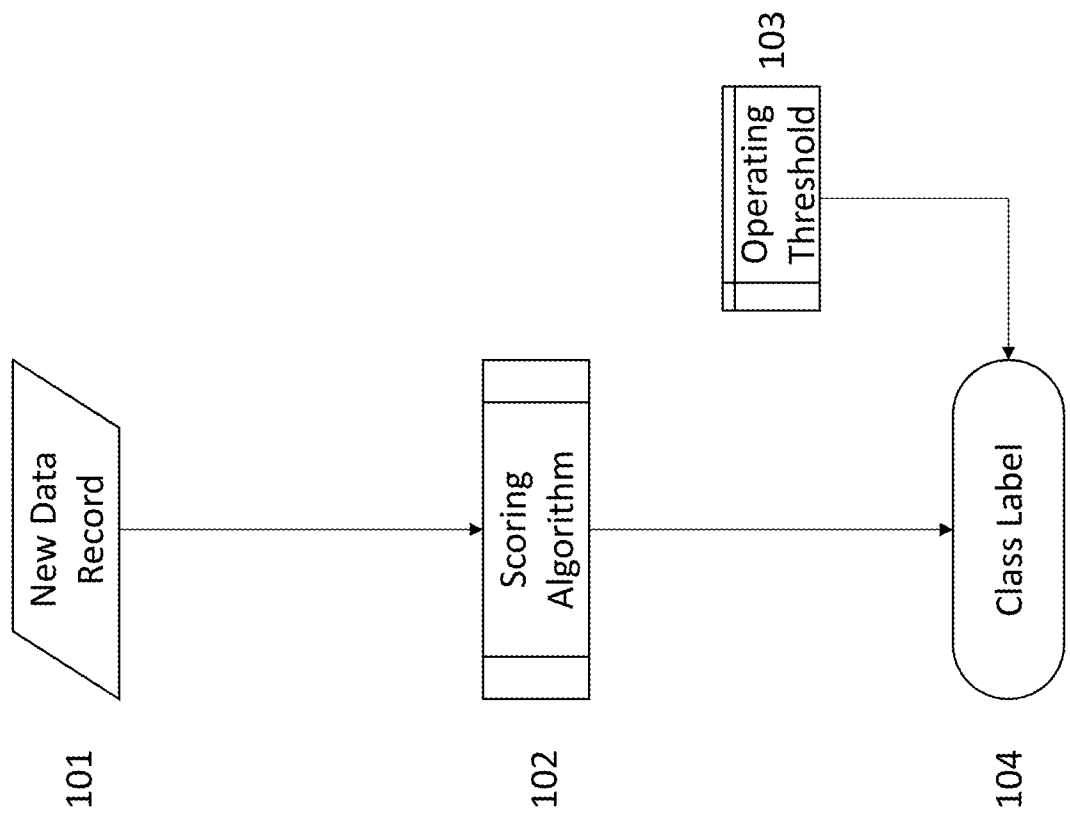
FIG. 1 is a flowchart illustrating a static stochastic process for multi-class classifications.

This document presents a predictive analytics system and method in the setting of multi-class classification, for identifying systematic changes in an evaluation dataset processed by a fraud-detection model by examining the time series histories of an ensemble of entities such as accounts. The ensemble of entities is examined and processed both individually and in aggregate, via a set of features determined previously using a distinct training dataset. In general, the specific set of features in question may be calculated from the entity's time series history, and may or may not be used by the model to perform the classification. Certain properties of the detected changes are measured and used to improve the efficacy of the predictive model.

The system and method enhance the performance of any static stochastic algorithm for classification of input records ordered in time, in which the time-series histories of any entity or entities present in the whole of the data to be classified are correlated with the target. Such histories may involve segregating the data in question, by choosing some attribute associated with each of the input records individually and grouping input records according to this attribute. In some aspects of the system and method described herein, the degree to which such an attribute is considered "suitable" is determined by the degree to which the whole of the information contained in each of the individual histories is more predictive of class membership.

Such an effect exists in the training data as well. Furthermore, the techniques described herein are applicable whether such an attribute by which to segment the data is chosen or not—in the latter case the procedure includes choosing the identity attribute, on which the procedure of "segregation" described above would result in no change.

Once an attribute has been selected (whether the identity attribute or not), a set of features is computed algorithmically using a training dataset with known tags that have been segregated based on this attribute. This set of features may be computed in any suitable manner, provided that any preprocessing of the records in the segregated time series relies only on prior records within that segregated time series history.

This algorithmically-generated feature set is then constructed in-situ using incoming data to be classified. The same segmentation is applied to this data, and the histories of the segregated entities are tracked within the space defined by this feature set. The recent histories of the segregated entities in this feature space are monitored in aggregate. For an incoming record to be classified, its entity is discerned via the specified attribute, the step taken by the entity in question in feature space resulting from the new record is calculated, and this step is used along with the aggregate information to adjust the output of the existing algorithm.

In the context of payment card fraud detection, the single most reliable predictor of whether a given transaction is fraudulent is the degree to which it is consistent with the history of transactions from the same cardholder. Furthermore, a fraud-detection model trained in a supervised manner, using a set of historical transactions with known tags, has the advantage that it would not necessarily characterize each and every abrupt behavioral change on a cardholder-by-cardholder basis as indicative of fraud; rather, it would learn to distinguish those changes that are typically indicative of fraud from those that typically are not. The "segregation" in this case is performed on an account-by-account basis (assuming for notational clarity that each account corresponds to a single cardholder), and the supervised training occurs on a historical dataset segmented in this manner. In the specific revolutionary (now canonical) application described above, a standard feed-forward, fully-connected neural network is trained using backpropagation and stochastic gradient descent on tagged input records involving, for a given transaction associated with a given cardholder, the current transaction and the previous transactions from that cardholder. In general the real-valued inputs to the neural network may involve expert-generated or algorithmically-generated features or both, but in both cases they will involve only the subset of transactions mentioned above.

In this case, invariably, the final hidden layer of the neural network contains many fewer nodes than the input layer, reflecting the distillation of all fraud-related attributes of the inputs as present in the historical data. Whereas the inputs represent (among other things) the degree to which the current transaction is unusual with respect to historical cardholder behavior, this distillation entails finding a distinction among these specifically with respect to fraud. Given a new transaction, then, the primary function of the neural network (along with the calculation of input features) is to provide a mapping from the enormous input space containing the transaction and the previous transactions from that cardholder to the comparatively miniscule space defined by the final hidden layer. In the canonical feed-forward, fully-connected architecture, the final output of the neural network is computed by applying a nonlinear function, called an "activation function", to a linear combination of the values of the nodes in the final hidden layer. Normally, the activation function is isotonic, continuous, differentiable, and normalizable; most commonly, either the logistic function or the hyperbolic tangent are used as each satisfies these conditions. In principle, an activation function not satisfying some or all of these conditions may be used; however, if the activation function is isotonic or antitonic (and thus preserves rank-ordering up to an overall sign), the representation defined by this space is "explicit" in the sense that the rank-ordering of outputs is determined by a linear transformation on the space. Thus, direct inspection of transactions mapped to this space would tend to reflect superficially those aspects of the transactions and their histories relevant to the output of the network, and by extension to the likelihood of the transaction's unusualness with respect to the account's history, and by further extension the likelihood that these attributes are indicative of fraud. Furthermore, while an activation function that does not satisfy some or all of the above conditions may result in a representation not satisfying this notion of "explicitness", the same method would nevertheless be applicable and may be similarly effective.

While concept drift may consist of any systematic shift in any of the properties of the input dataset over the course of time, only a small subset of these shifts could be expected to impact on the performance of the neural network in question, for the same reason that the mapping performed by the neural network is effective in distilling information from the input space: Specifically, the neural network amplifies qualities of the input data that are relevant to fraud detection and suppresses qualities that are not. By the same token, because mapping the set of inputs to the feature space is deterministic, any quantity measured by first mapping the set of input records to the feature space and then examining the dynamics of these features is also, in principle, measurable simply via examination of the inputs themselves. Naïvely, then, the mapping in question would seem superfluous, and measuring concept drift by examining the inputs themselves ("direct" monitoring), rather than the features, is more thorough and therefore more effective.

In the general case there is no question that "direct" monitoring is always more thorough. When the task being processed by the computing system necessitates parsing the inputs in such a nuanced manner as to require use of such a powerful algorithm as a neural network, many—depending on the case, possibly the vast majority—of the examples of concept drift that cause the performance of the algorithm to degrade are extremely difficult to distinguish via the input features from other examples of concept drift which may have negligible effect on the performance of the algorithm, while making such a distinction is precisely the task for which the neural network is trained. Thus time series distributions of hidden nodes have a rich structure and can be used to extract those properties of the raw input data that are most relevant to fraud detection, to detect differences in them, and to characterize the manner in which they evolve in time. Those skilled in the art will recognize that such a characterization of relevance with respect to the measurement of concept drift may be used in several different ways to improve the performance of the algorithm in question, and may be of general interest in itself. However, in preferred implementations, a method by which this measurement is used to improve the performance of the classifier is described below, and is characterized both by the measurement of concept drift and the properties of the entity being classified.

FIG. 1 is a flowchart of a process 100 by which a static stochastic scoring algorithm for multi-class classification consumes a new data record and assigns a class label to this data record. At 101, a new data record is received. At 102, at least one computer processor executes the scoring algorithm on the new data record, to generate a class label at 104. The at least one computer processor further applies an operating threshold on the class label, at 103.

Figure 2:
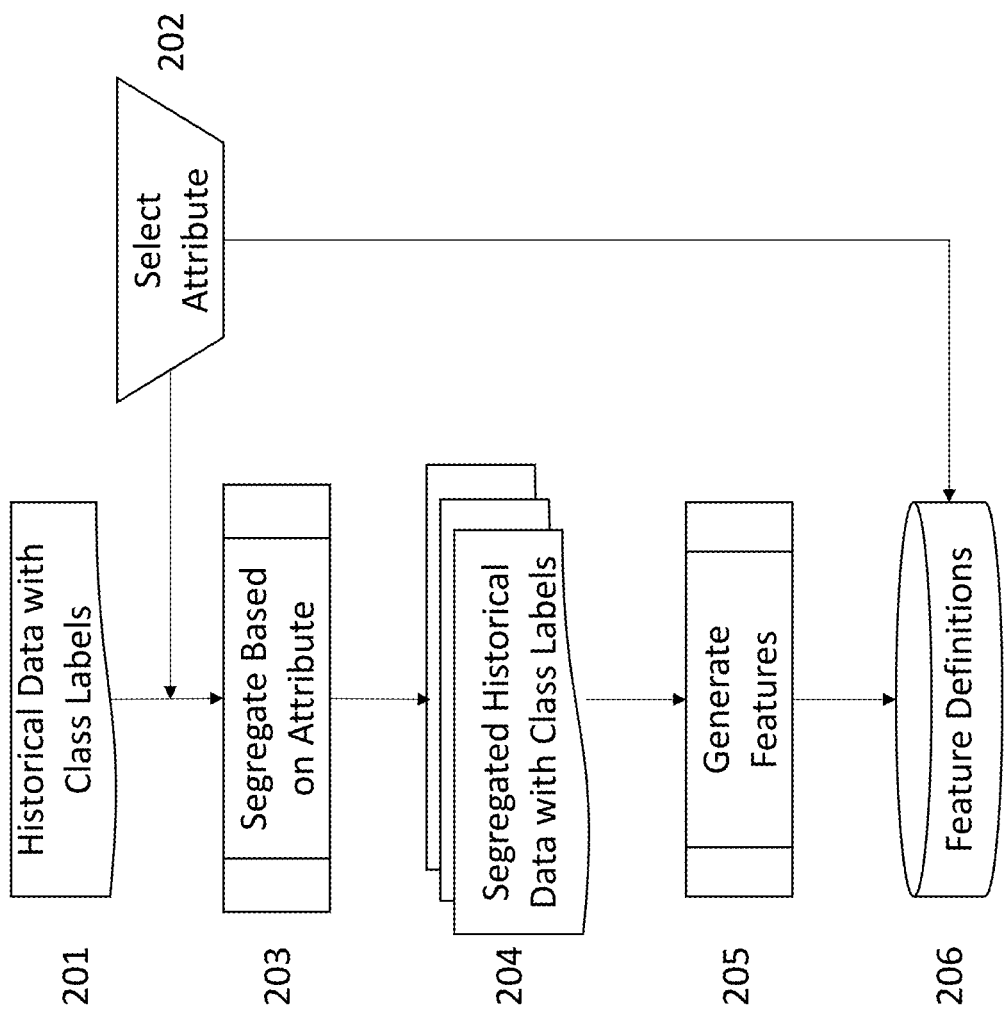
FIG. 2 is a flowchart illustrating a process by which a feature set is created.

FIG. 2 is a flowchart of a process 200 by which the algorithmically-generated feature set is created, using (a) the historical dataset with known class tags 201 and (b) the choice of attribute 202. The resulting feature definitions 206 are a compendium of all information required to map an arbitrary new data record to the feature set generated in 205, including the chosen attribute 202.

Figure 3:
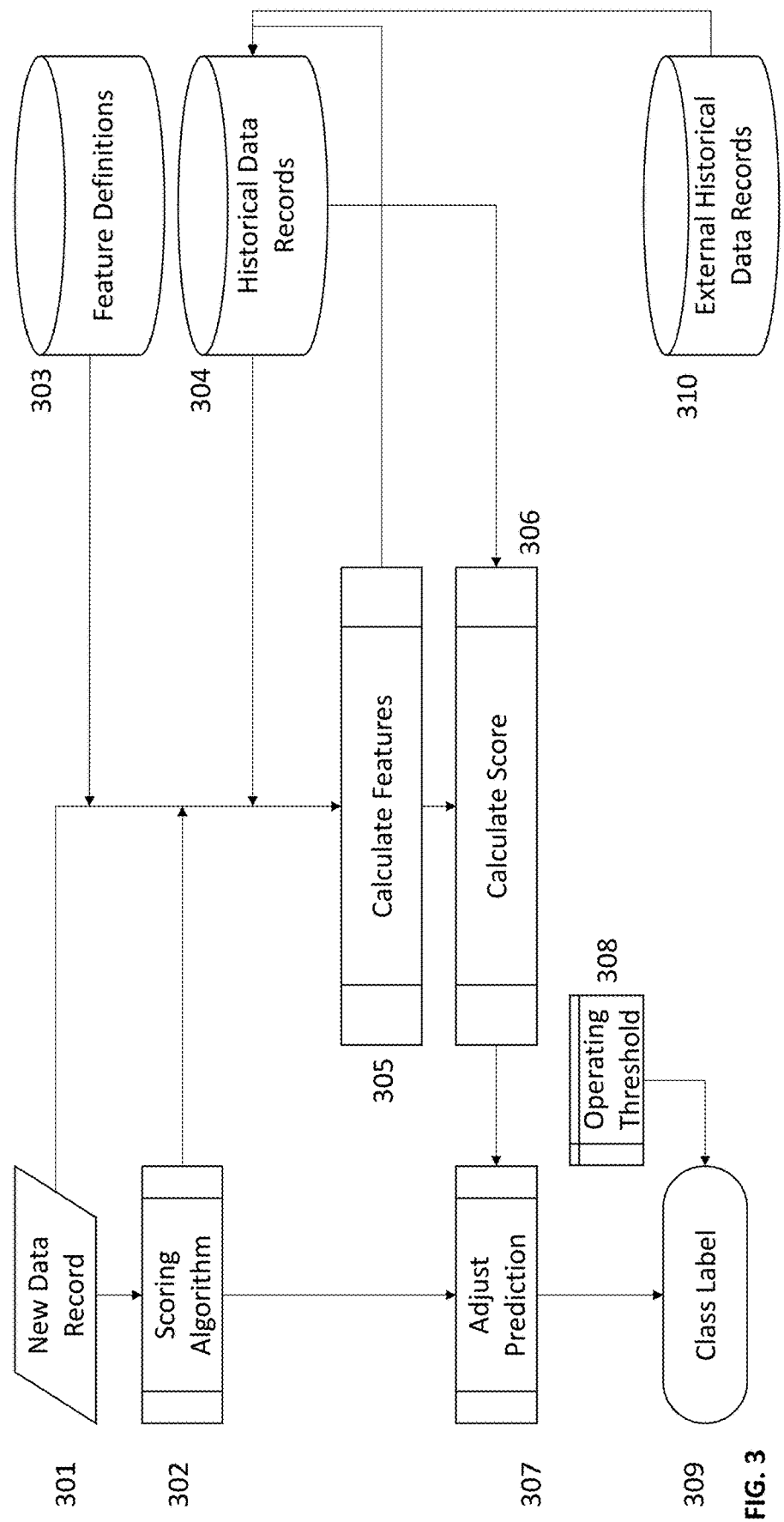
FIG. 3 is a flowchart illustrating a process by which a static stochastic algorithm for multi-class classification shown in FIG. 1 is adjusted in real time.

FIG. 3 is a flowchart of a process 300 by which the static stochastic algorithm for multi-class classification shown in FIG. 1 is adjusted in real time based on feature definitions 303, which in some implementations are similar to feature definitions 206 shown and described in FIG. 2, and (b) the historical data records 304, which in one embodiment may consist solely of previous data records consumed by this process.

In accordance with preferred exemplary implementations, let:

$$S=\{h_i \in R^{N_s} | i=1, \ldots, M\}$$

where $N_s$ is the number of algorithmically-generated features. Each of $h_i$ belongs to a specific account label a in A ($N_a$ accounts) and client label c in C ($N_c$ clients), and occurs at an arbitrary date-time. Each account belongs to a specific client, so that for any $h_i$, $h_j$ in S whose account labels $a_i$ and $a_j$ are equal, their client labels $c_i$ and $c_j$ must also be equal. Note that the words "account" and "client" in this definition are for illustrative purposes only and should not be construed to unduly constrain the scope of the methods and procedures described here. In particular, a "client" may consist of any partitioning of the dataset in question, and an "account" may consist of any further partitioning of the dataset in question, provided that the conditions above are met. The method for measuring relevant concept drift may be implemented by any one, or by any combination, of the following procedures:

1) The account labels A are discarded and the dataset is treated as a set of $N_s*N_c$ irregular time series in $\mathbb{R}^1$.

2) The client labels C and account labels A are discarded and the dataset is treated as a set of $N_s$ irregular time series in $\mathbb{R}^1$.

3) The account labels A are used to construct a point-to-point trajectory between each pair of account-wise consecutive events, the termini of which coincide with the earlier and later of the events, respectively. The account labels A are subsequently discarded and the dataset is treated as a set of $N_s*N_c$ time series in $\mathbb{R}^2$.

4) The client labels C and account labels A are used to construct a point-to-point trajectory between each pair of account-wise consecutive events, the termini of which coincide with the earlier and later of the events, respectively. The account labels A are subsequently discarded and the dataset is treated as a set of $N_s$ time series in $\mathbb{R}^2$.

5) The account labels A are used to construct a point-to-point trajectory between each pair of account-wise consecutive events, the termini of which coincide with the earlier and later of the events, respectively. The account labels A are subsequently discarded, an integer d is chosen such that $0 \leq d < N_s$, and the dataset is treated as a set of $(N_s-d)*N_c$ time series in $\mathbb{R}^{2+d}$.

6) The client labels C account labels A are used to construct a point-to-point trajectory between each pair of account-wise consecutive events, the termini of which coincide with the earlier and later of the events, respectively. The account labels A are subsequently discarded, an integer d is chosen such that $0 \leq d < N_s$, and the dataset is treated as a set of $N_s-d$ time series in $\mathbb{R}^{2+d}$.

Note that implementations 3 and 4 above, made explicit for the purpose of exhibition, are special cases of implementations 5 and 6, respectively, in which d=0.

The result of this procedure is a measurement, at any given point in time, of the degree to which the dataset appears to be undergoing a systematic shift in the given feature space, viewed as a collection of entities defined be the account labels A evolving in that space. The subsequent application of this measurement to improve performance of the algorithm is a separate step in principle, and the result of this measurement may be of general utility beyond the scope of this invention. In a specific implementation of this measurement, a new record is mapped to the same space as defined by the implementation(s) above, and the output of the algorithm for that record adjusted based both on the characteristics of the new record and the global characteristics of the concept drift measurement. This reflects the degree to which the record in question is likely to have resulted from any concept drift underway.

As one example, consider once again the setting of payment card fraud detection using a neural network. The neural network is trained in a supervised manner on historical transactions, each of which is associated with exactly one cardholder account. Prior to training, the transactions are separated based on account label, such that each account then consists of a time-ordered series of input records; then the raw inputs to the neural network consist of the combination of the input record to be scored and the previous records corresponding to that same account. In operation, the computer-implemented algorithm continually applies the same separation based on account label to the collection of records it scores as in training, so that in order to score a new record, both the new record and previous records with the same account label are used as inputs to the neural network.

In the following experiments, such a model is employed. The model is based on a standard feed-forward neural network, using a nonlinear isotonic activation function, with a single real-valued output corresponding to the probability that the input record in question is fraudulent, a single fully-connected hidden layer consisting of 17 nodes, and an input layer consisting of 114 variables. For a given input record corresponding to a given cardholder account, the input variables are constructed using both the record in question and the prior records corresponding to the same account. In these experiments, the account label is the attribute by which data is segregated, the 17 hidden nodes are the algorithmically-generated features constructed on a historical, dedicated dataset consisting of transactions with known fraud tags partitioned in the same account-wise scheme, and the real-valued output of the neural network for a given input record is the quantity to be modified based on the concept drift measurements and their relationship to the corresponding representation of the input and the previous records from the same account in feature space.

Figure 4:
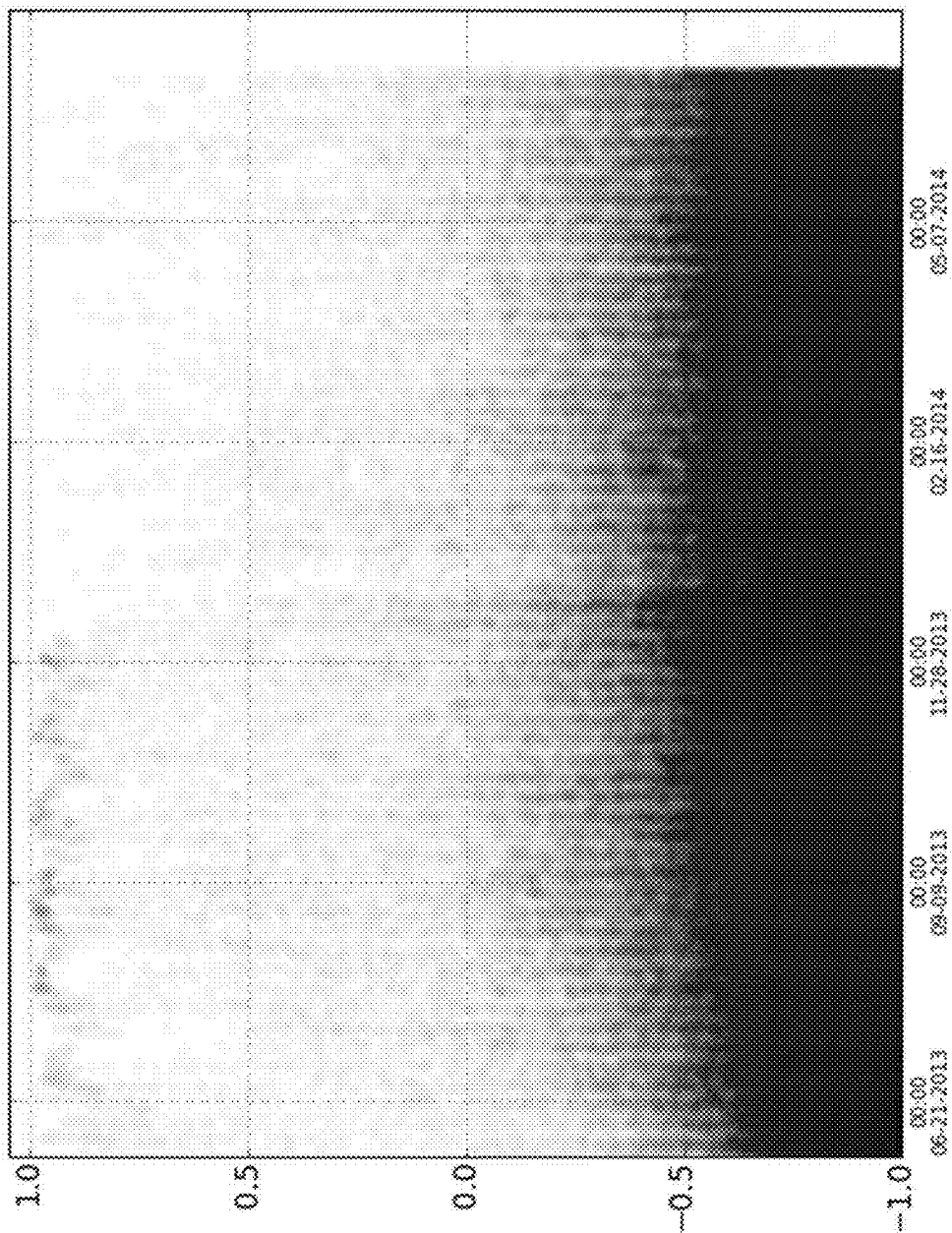
FIG. 4 shows a plot containing the values of one of the algorithmically-generated features, in accordance with some implementations.

FIG. 4 shows, for a specific implementation, a plot containing the values as in 305 of one of the algorithmically-generated features defined by 303. In this implementation, these values may comprise a subset of the historical data records 304. FIG. 4 shows a distribution of one of the features in question plotted across time, in which an abrupt and persistent shift is apparent approximately halfway through the time period spanned by the data. Distributions similar to this would be used in implementations 1 and 2 as described above.

Figure 5:
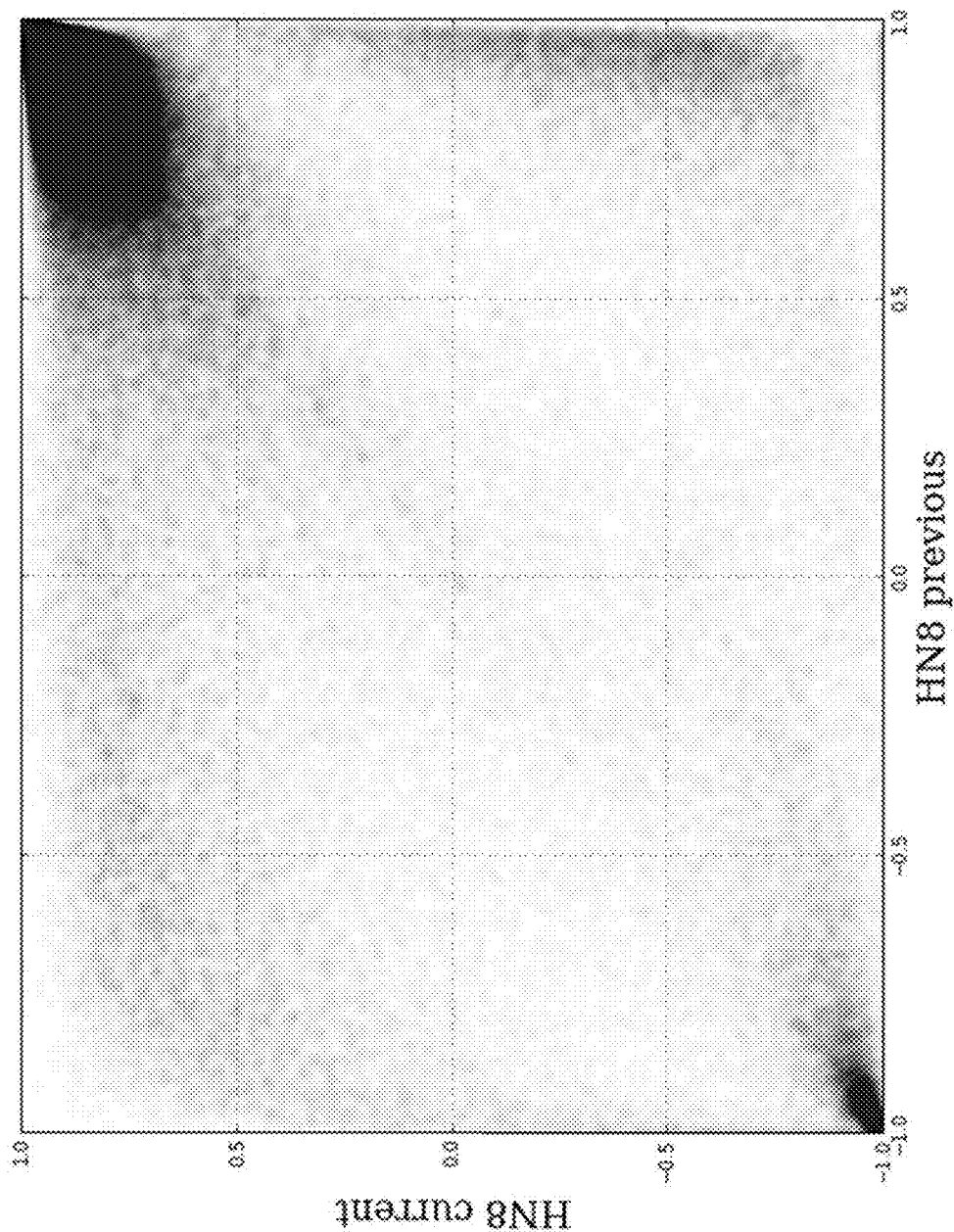
FIG. 5 shows a plot containing the values of one of the algorithmically-generated features, in accordance with alternative implementations.

FIG. 5 shows, for a specific implementation, a plot containing the values as in 305 of one of the algorithmically-generated features defined by 303. As distinct from the values shown in FIG. 4, the values shown in this plot demonstrate the step taken in the relevant dimension of the vector space defined by the algorithmically-generated features defined by 303 by the specific entity in question as defined by the chosen attribute. In this implementation, these values may comprise a subset of the historical data records 304. FIG. 5 shows a two-dimensional distribution in which the current value of the feature is plotted against the previous value based on the account label a. This plot shows a time-integrated snapshot of the feature; however, in implementations 3 and 4, the time series evolution of distributions similar to these would be used to monitor the feature dynamics in order to detect concept drift.

For operational convenience, the real-valued output of the neural network is converted into a score ranging from 1 to 999, by which a higher score corresponds to a higher likelihood of fraud.

In extreme cases corresponding to implementations 3 and 4 in which d=0, the various features are treated independently of one another until the summary statistic is calculated. In the more general case, this restriction need not be realized; rather the effect of concept drift may be measured and acted on somewhat more directly by tracking the entity dynamics in the space spanned by the features. In implementations 5 and 6 above, this case corresponds to choosing $d=N_s-1$.

In this context the question of tracking concept drift lends itself to an intuitive interpretation which could inform the operations ultimately used to calculate a summary statistic: Over a given fixed time period, the feature space in $\mathbb{R}^{N_s}$ is populated with a directed pair of points—corresponding to the vector difference between the associated current and previous feature vectors—for each new datum accrued. The result is analogous to an ensemble of non-interacting particles undergoing stochastic motion in which the distance between a given pair of feature vectors is analogous to velocity.

Figure 6:
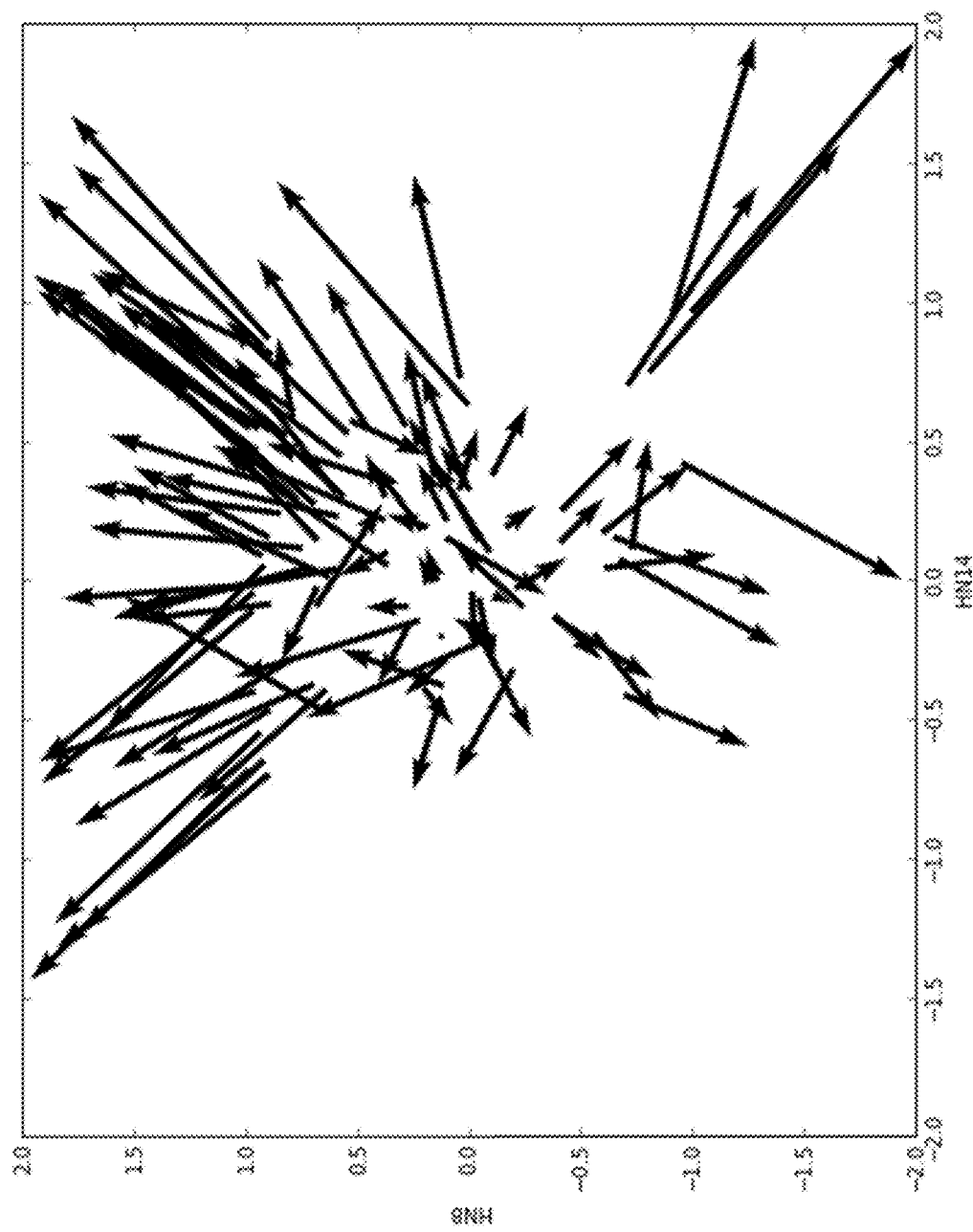
FIG. 6 shows a plot containing the values of two of the algorithmically-generated features, in accordance with yet other implementations.

One example in a two-dimensional feature space is shown in FIG. 6. FIG. 6 shows, for a specific implementation, a plot containing the values as in 305 of two of the algorithmically-generated features defined by 303. As distinct from the values shown in FIG. 4 and FIG. 5, the directed pairs of values shown in this plot, represented by arrows, demonstrate the step taken in the relevant two-dimensional subspace of the vector space defined by the algorithmically-generated features defined by 303 by the specific entity in question as defined by the chosen attribute. In this implementation, these values may comprise a subset of the historical data records 304.

While no notion of thermodynamic equilibrium would necessarily apply to such a system insofar as no analogue to the principle of least action suggests itself, a concept drift large and "relevant" enough to affect the outcome of the algorithm in a systematic manner would manifest itself as a corresponding shift in the dynamics of the ensemble.

Specifically, the microscopic velocity alluded to above can be used:

$$v^{(i)} = \sqrt{\sum_{j=1}^{N_s} (x_j^{(i)} - x_j^{(i,prev)})^2}$$

to calculate the root-mean-square ("rms") speed for an ensemble consisting of $N_d$ elements, the scale of the typical velocity is determined as follows:

$$v_{rms} = \sqrt{\frac{1}{N_d} \sum_{i=1}^{N_d} (v^{(i)})^2}$$

Similarly, a bulk velocity measuring transport on the scale of the ensemble can be defined as follows:

$$V_{b,j} = \sum_{i=1}^{N_d} (x_j^{(i)} - x_j^{(i,prev)})$$

For a new record, then, one possible measure of the degree to which the record's new position in feature space is due to a macroscopic transport effect is the inner product between its velocity normalized by the rms speed, and the bulk velocity:

$$\alpha^{(i)} = \frac{1}{v_{rms}} \sum_{j=1}^{N_s} V_{b,j} v^{(i)}$$

Note that this measure may be trivially modified to measure the record's overlap with changes in bulk velocity on a given timescale by e.g. subtracting the rolling mean over that window of $V_b$ from $V_b$.

Figure 7:
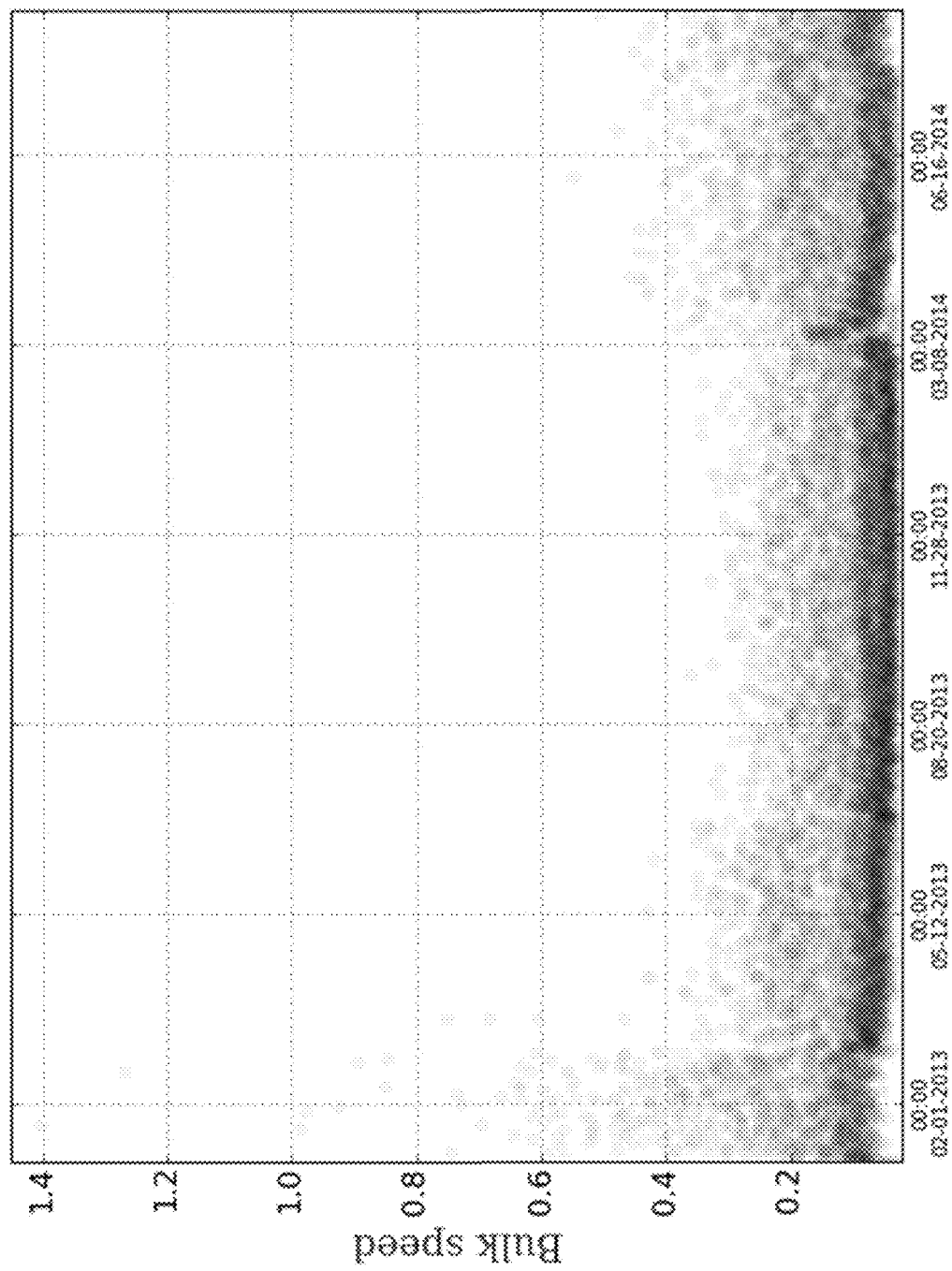
FIG. 7 shows a plot containing the values of a macroscopic property of collected historical data records.
Figure 8:
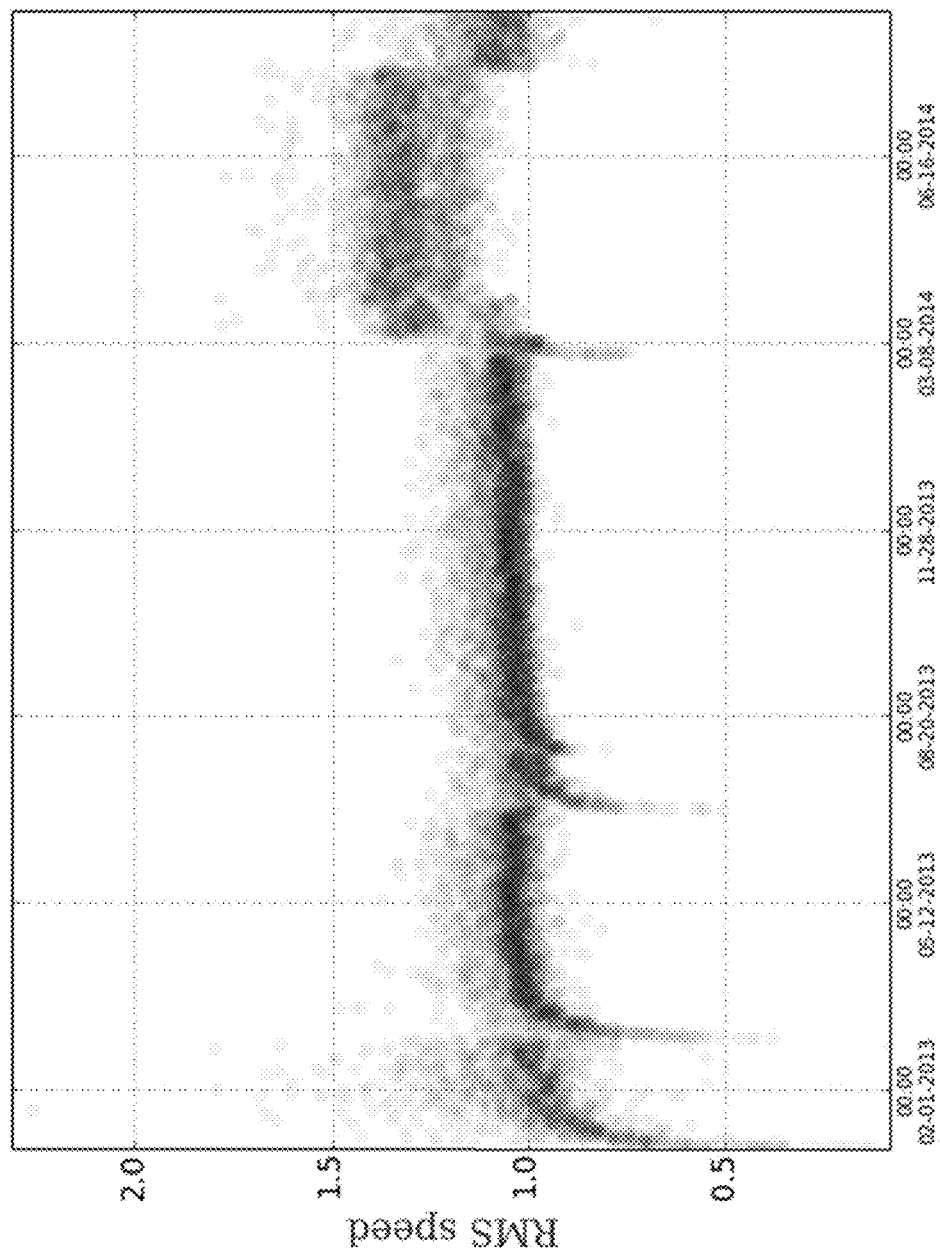
FIG. 8 shows a plot containing the values of a microscopic property of new data records.

Examples of the hourly bulk speed and microscopic rms speed for a dataset containing multiple cases of sudden concept drift are shown in FIG. 7 and FIG. 8 respectively. FIG. 7 shows, for a specific implementation, a plot containing the values of a particular macroscopic property of the collected historical data records 304 defined in terms of microscopic primitives or features similar in principle but differing in substance to those demonstrated in FIG. 6. FIG. 8 shows, for a specific implementation, a plot containing the values as in 305 of a particular microscopic feature of the new data record 301 defined in terms of microscopic primitives or features similar in principle but differing in substance to those demonstrated in FIG. 6.

Figure 9:
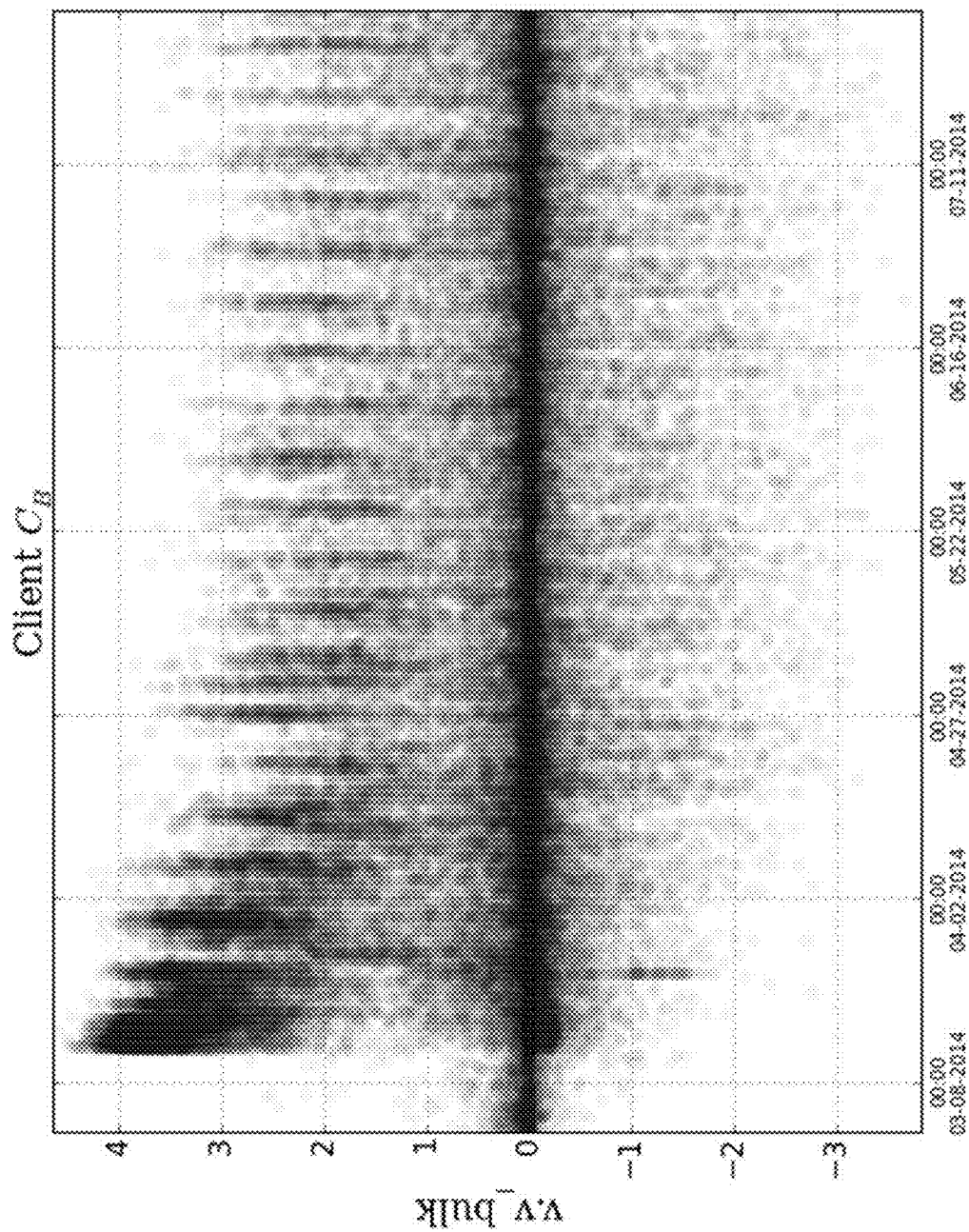
FIG. 9 shows a plot containing the values of a particular microscopic derived feature of the new data records defined in terms of a particular microscopic derived feature.

FIG. 9 shows, for a specific implementation, a plot containing the values as in 306 of a particular microscopic feature of the new data record 301 defined in terms of a particular microscopic feature similar in principle but differing in substance to that demonstrated in FIG. 8 and in terms of a particular macroscopic property similar in principle but differing in substance to that demonstrated in FIG. 7.

Figure 11:
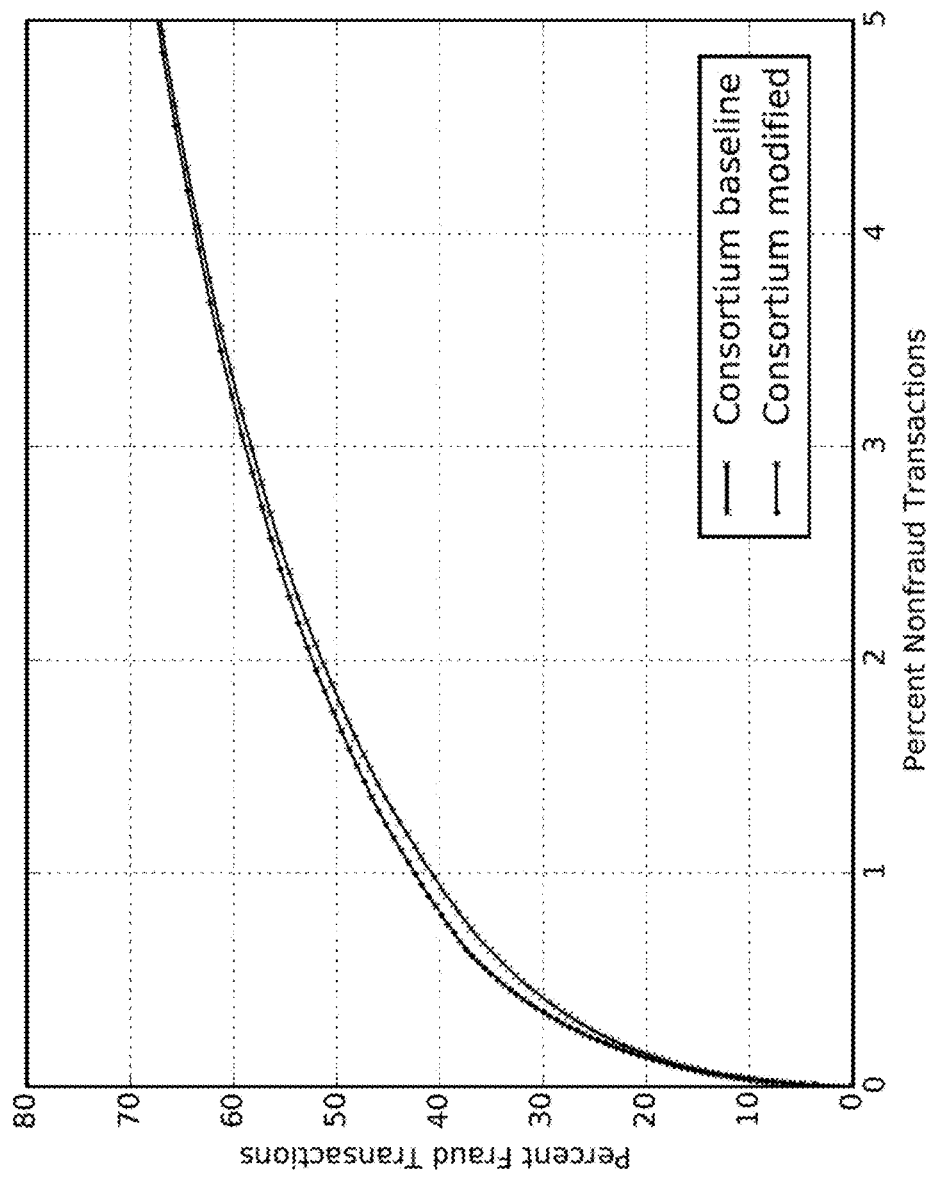
FIGS. 11-13 each show a plot of the original and modified ROC curves as in FIG. 1 and FIG. 3 respectively, according to various implementations.

Substantial performance improvement over the baseline algorithm is obtained in this example by making a straightforward adjustment: The adjusted output for all records for which (a) the original output of the algorithm exceeds some fixed threshold, and (b) the dot product between the record's velocity and the most recent bulk velocity exceeds some other fixed threshold, is calculated by subtracting the magnitude of the dot product times some other fixed constant. FIG. 11 shows the ROC curves for the original and modified algorithms for which all records scoring above 500 and with a dot product greater than the rms corresponding to the bulk collected over the prior calendar day are modified by subtracting the magnitude of the dot product from the original score in log-odds space—in many cases, relative improvement in detection rate at fixed false positive rate exceeds 10%, as does relative reduction of false positives at a fixed detection rate.

Figure 10:
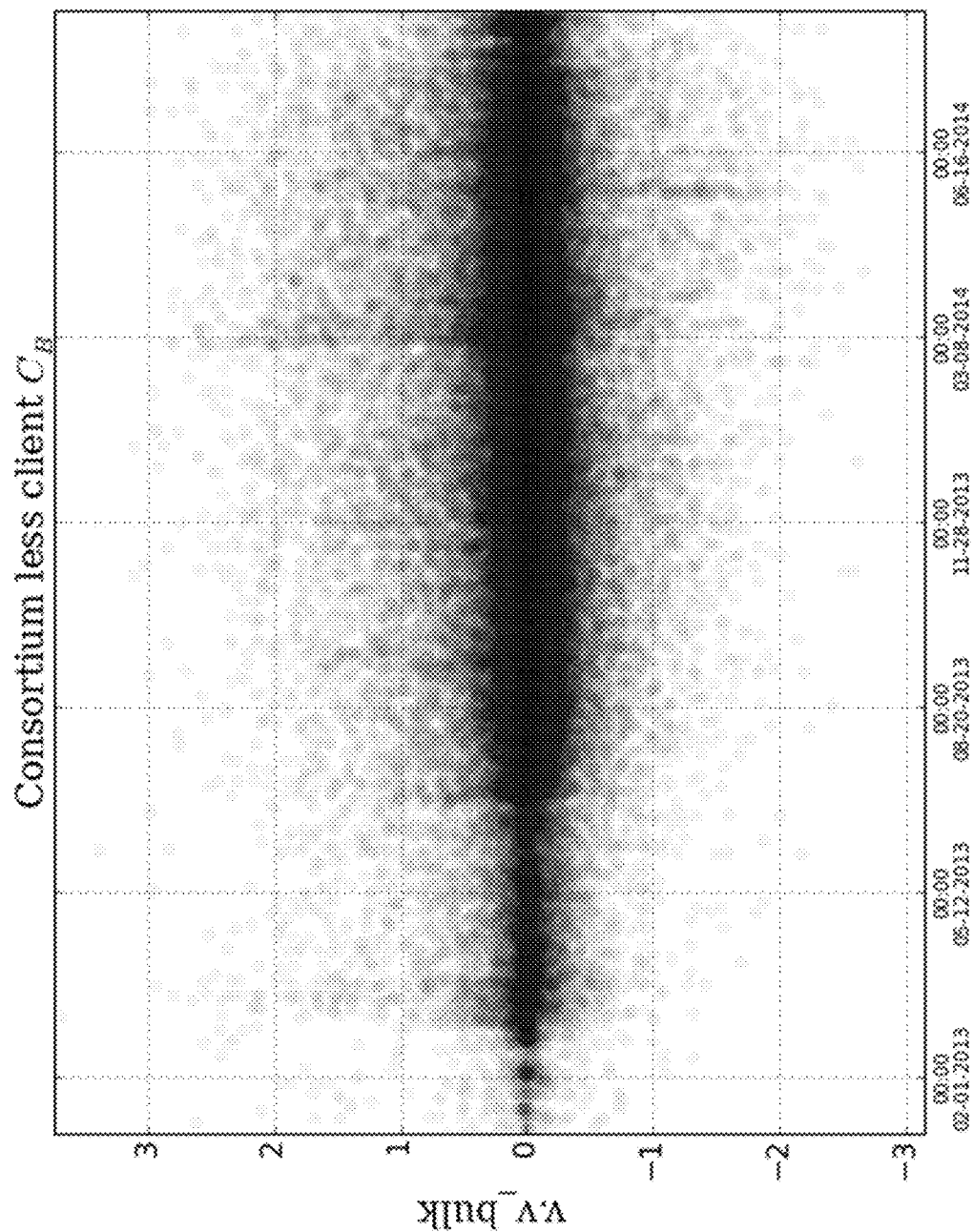
FIG. 10 shows a plot containing the values of a particular microscopic derived feature of the new data records, where the new data records and historical data records are mutually exclusive.

Of the several sources of concept drift present in this dataset, some are isolated to particular clients. The most egregious example of this effect in this particular case begins near Mar. 15, 2014—this sudden and dramatic concept drift is isolated to a particular client denoted $C_B$. FIG. 9 and FIG. 10 demonstrate that the inner product for client $C_B$ reflects the dramatic shift, while the corresponding quantity for the union of remaining clients evinces a much more gradual evolution in time. It is instructive to repeat the score-adjustment experiment in both these cases separately.

Figure 12:
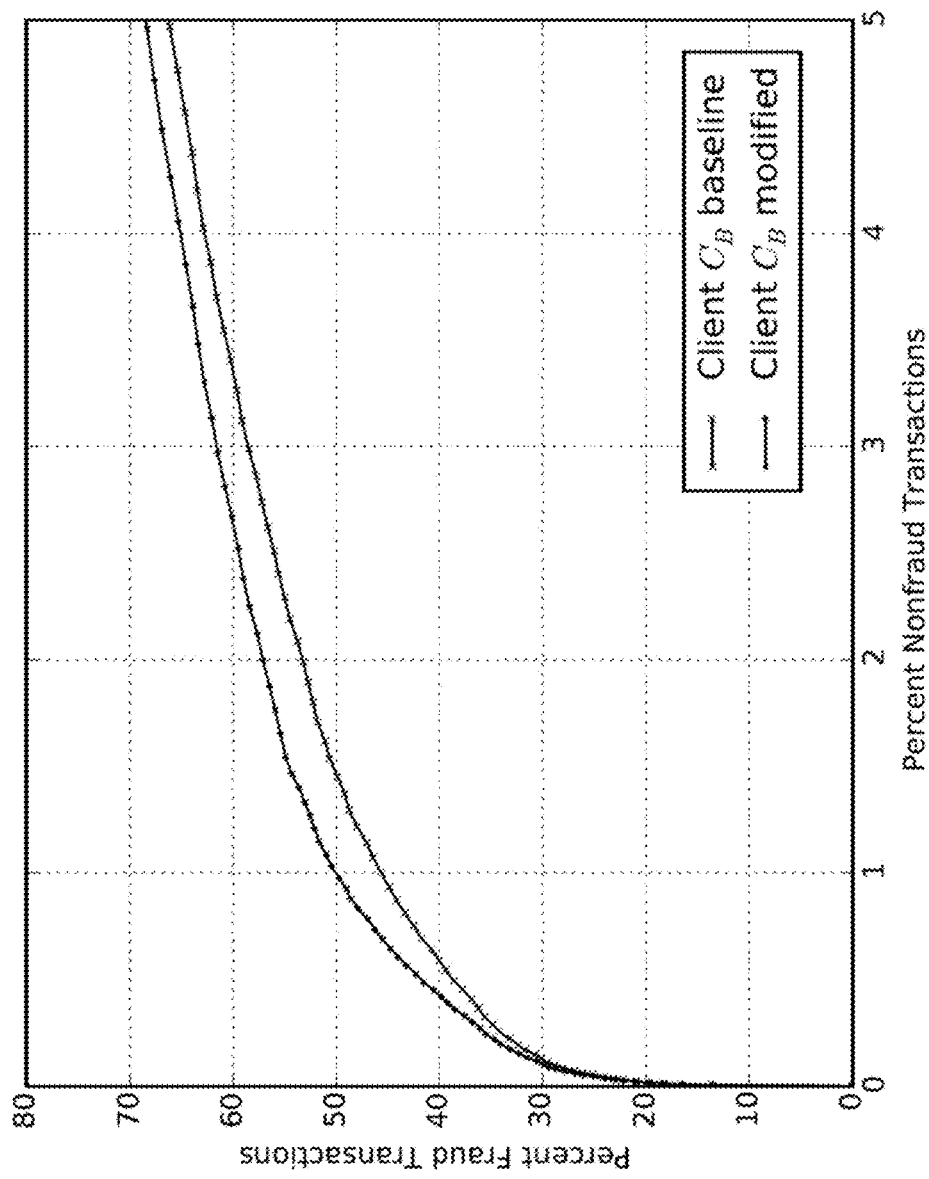
Figure 13:
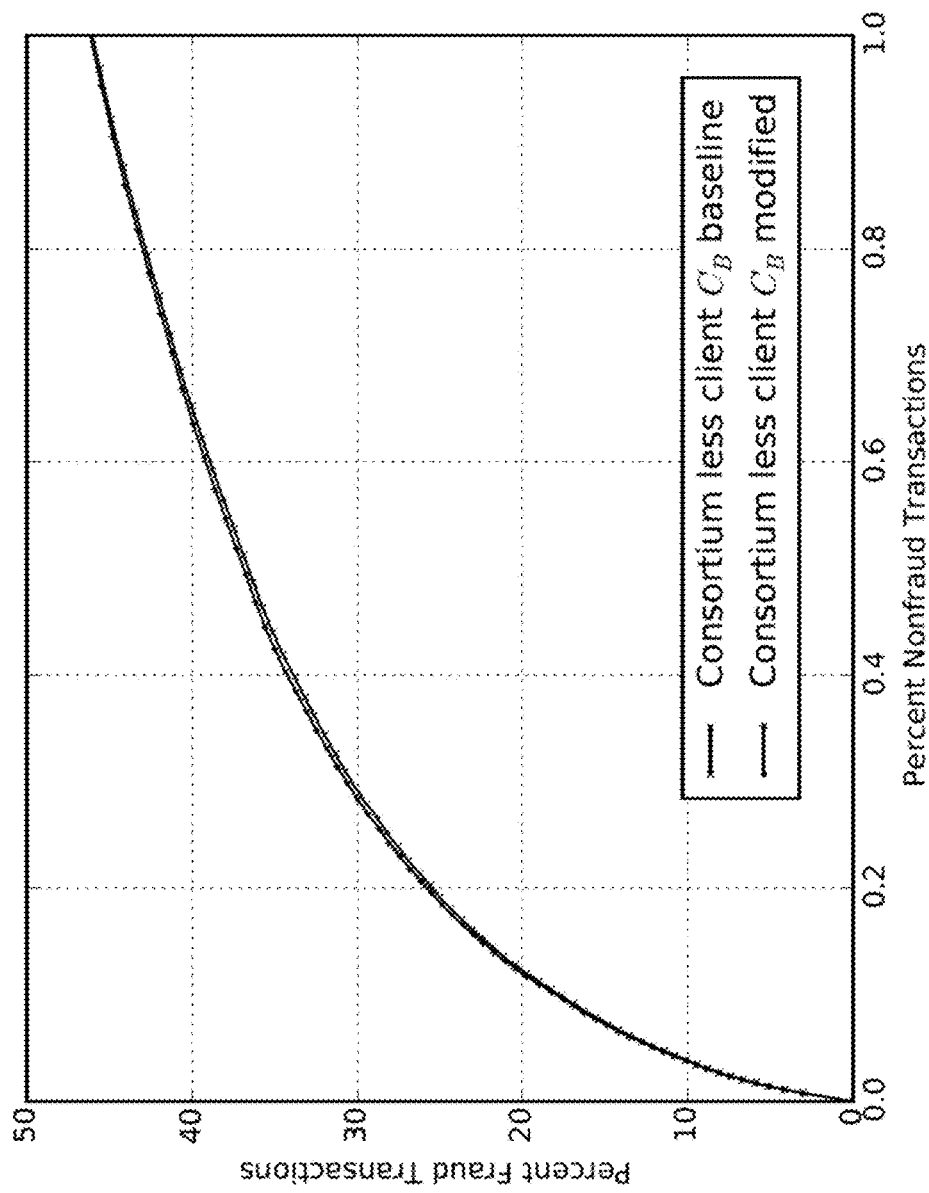

FIG. 12 and FIG. 13 show ROC curves for $C_B$ alone and the consortium less $C_B$, respectively. That the performance lift is higher in the former case suggest the method of adjusting scores based in this Figure of merit is particularly well-suited to identifying "real" concept drift, in which the functional relationships between features and class membership is systematically different on a large scale from the concepts used in training the model. Notably, the method does not appear to depend heavily on global time-series information in this case. Nevertheless the positive lift present in both cases provides anecdotal evidence that the method is robust against a range of conditions. Further in the consortium less $C_B$ case the performance is improved, and not degraded by the adjustment of the client $C_B$.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying Figures and/or described herein do not necessarily require the particular order shown, or sequential order, to achieve desirable results. Other implementations may be within the scope of the following claims.

What is claimed is:

1. A computer-implemented method executed on one or more processors, the method comprising:
    selecting at least one attribute of one or more input data records associated with payment card transaction activity;
    partitioning one or more datasets according to a partitioning scheme that is based on the at least one attribute to generate a summary statistic of historical data records, the summary statistic of the historical data records being generated based on historical data records over a given fixed time period by populating a feature space with a directed pair of points for a new datum accrued;
    generating a set of features based on the historical data records, the set of features based on the historical data records being hidden nodes of a feed-forward neural network and at least one of the historical data records having a known class membership, the set of features being generated according to different class labels for the known class membership;
    calculating a set of microscopic derived features for a new input data record or previous input data records, based on the partitioning and the set of features, the set of microscopic derived features being related to the selected at least one attribute and associated with at least one entity defined by the partitioning scheme;
    generating a set of macroscopic derived features based on the aggregated set of microscopic derived features calculated for the new and previous input data records based on the partitioning and the set of features, the set of macroscopic derived features representing concept drift of the one or more datasets;
    generating a first score representing a likelihood of an extent and magnitude of the concept drift representing a systematic shift in a property of the one or more input data records over a course of time;
    generating a second score representing a likelihood that a new input data record is subject to the extent and magnitude of the concept drift representing by the first score; and
    adjusting a class membership for the new input data record using the feed-forward neural network according to at least the magnitude of the concept drift, including a binary classification for fraud detection, the feed-forward neural network being trained using back-propagation and stochastic gradient decent on tagged input data records involving at least a first transaction and a second transaction associated with a cardholder, the second transaction being prior in time to the first transaction, the adjusting improving detection of fraud in payment card transactions by determining the degree with which the payment card transaction activity for the cardholder is unusual with respect to historical cardholder behavior.

2. The method in accordance with claim 1, wherein the new input data records and the historical data records are mutually exclusive.

3. The method in accordance with claim 1, wherein the class membership adjustment is trained according to the partitioning scheme.

4. The method in accordance with claim 1, wherein the class membership adjustment is trained according to the historical data records.

5. The method in accordance with claim 1, wherein the class membership adjustment includes a binary classification for fraud detection.

6. The method in accordance with claim 1, wherein partitioning the one or more data records includes generating a summary statistic of the historical data records prior to generating the set of features based on the historical data records.

7. A computer program product comprising a non-transitory machine-readable medium storing instructions that, when executed by at least one programmable processor, cause the at least one programmable processor to perform operations comprising:
- selecting at least one attribute of one or more input data records associated with payment card transaction activity;
- partitioning one or more datasets according to a partitioning scheme that is based on the at least one attribute to generate a summary statistic of historical data records, the one or more datasets having at least one input data record;
- generating a set of features based on historical data records, the set of features based on the historical data records being hidden nodes of a feed-forward neural network and at least one of the historical data records having a known class membership, the set of features being generated according to different class labels for the known class membership;
- calculating a set of microscopic derived features for a new input data record or previous input data records, based on the partitioning and the set of features, the set of microscopic derived features being related to the selected at least one attribute;
- generating a set of macroscopic derived features based on the aggregated set of microscopic derived features calculated for the new and previous input data records based on the partitioning and the set of features, the set of macroscopic derived features representing a concept drift of the one or more datasets, the concept drift comprising at least a systematic shift in a property of the one or more data records;
- generating a first score representing a likelihood of an extent and magnitude of the concept drift representing a systematic shift in a property of the one or more input data records over a course of time;
- generating, using the set of microscopic derived features and the set of macroscopic derived features for previous input data records, a second score representing a likelihood that a new input data record is subject to the extent and magnitude of the concept drift representing by the first score;
- adjusting a class membership for the new input data record using the feed-forward neural network according to the partitioning scheme based on the second score and the magnitude of the concept drift, including a binary classification for fraud detection; and
- determining the degree with which the payment card transaction activity for a cardholder is unusual with respect to historical cardholder behavior.

8. The computer program product in accordance with claim 7, wherein the microscopic derived features are associated with entity defined by the partitioning scheme and wherein the new input data records and the historical data records are mutually exclusive.

9. The computer program product in accordance with claim 7, wherein the class membership adjustment is trained according to the partitioning scheme.

10. The computer program product in accordance with claim 7, wherein the class membership adjustment is trained according to the historical data records.

11. The computer program product in accordance with claim 7, wherein the class membership adjustment includes a binary classification for fraud detection.

12. The computer program product in accordance with claim 7, wherein partitioning the one or more data records includes generating a summary statistic of the historical data records prior to generating the set of features based on the historical data records.

13. A system comprising:
- at least one programmable processor; and
- a non-transitory, machine-readable medium storing instructions that, when executed by the at least one processor, cause the at least one programmable processor to perform operations comprising:
  - select at least one attribute of one or more input data records associated with payment card transaction activity;
  - partition one or more datasets according to a partitioning scheme that is based on the at least one attribute to generate a summary statistic of historical data records, the one or more datasets having at least one input data record;
  - generate a set of features based on historical data records, the set of features based on the historical data records being hidden nodes of a feed-forward neural network and at least of the historical data records having a known class membership, the set of features being generated according to different class labels for the known class membership;
  - calculate a set of microscopic derived features for a new input data record or previous input data records, based on the partitioning and the set of features, the set of microscopic derived features being related to the selected at least one attribute;
  - generate a set of macroscopic derived features based on the aggregated set of microscopic derived features calculated for the new and previous input data records based on the partitioning and the set of features, the set of macroscopic derived features representing concept drift of the one or more datasets;
  - generate a first score representing a likelihood of an extent and magnitude of the concept drift;
  - generate, using the set of microscopic derived features and the set of macroscopic derived features for previous input data records, a second score representing a likelihood that a new input data record is subject to the extent and magnitude of the concept drift representing by the first score; and
  - adjust a class membership for the new input data record using the feed-forward neural network according to at least the magnitude of the concept drift, including a binary classification for fraud detection, the feed-forward neural network being trained using back-propagation and stochastic gradient decent on tagged input data records involving at least a first transaction and a second transaction associated with a cardholder, the second transaction being prior in time to the first transaction.

14. The system in accordance with claim 13, wherein the set of microscopic derived features are associated with entity defined by the partitioning scheme and the detection of fraud is improved by determining an unusual degree of transaction activity with respect to historical behavior as determined based on the historical data records.

15. The system in accordance with claim 13, wherein the class membership adjustment is trained according to the partitioning scheme and new input data records and historical data records are mutually exclusive.

16. The system in accordance with claim 13, wherein the class membership adjustment is trained according to the historical data records.

17. The system in accordance with claim 13, wherein the class membership adjustment includes a binary classification for fraud detection.

* * * * *